(12) United States Patent
Popham et al.

(10) Patent No.: US 9,415,779 B2
(45) Date of Patent: Aug. 16, 2016

(54) VEHICLE CONTROL SYSTEM AND METHOD

(75) Inventors: Thomas Popham, Coventry (GB); Anna Gaszczak, Coventry (GB)

(73) Assignee: Jaguar Land Rover Limited (GB)

(*) Notice: Subject to any disclaimer, the term of this patent is extended or adjusted under 35 U.S.C. 154(b) by 0 days.

(21) Appl. No.: 14/232,093

(22) PCT Filed: Jul. 12, 2012

(86) PCT No.: PCT/EP2012/063730
§ 371 (c)(1),
(2), (4) Date: Mar. 11, 2014

(87) PCT Pub. No.: WO2013/007800
PCT Pub. Date: Jan. 17, 2013

(65) Prior Publication Data
US 2014/0188350 A1 Jul. 3, 2014

(30) Foreign Application Priority Data
Jul. 13, 2011 (GB) .................................. 1111993.0

(51) Int. Cl.
*B60W 10/10* (2012.01)
*B60W 50/00* (2006.01)
(Continued)

(52) U.S. Cl.
CPC .......... *B60W 50/0098* (2013.01); *B60W 10/06* (2013.01); *B60W 10/10* (2013.01); *B60W 10/18* (2013.01); *B60W 10/20* (2013.01); *B60W 10/22* (2013.01); *B60W 50/082* (2013.01); *B60W 50/085* (2013.01); *B60W 40/06* (2013.01);
(Continued)

(58) Field of Classification Search
USPC ........... 701/36, 37, 41, 48, 49, 51, 52, 53, 54, 701/58, 65, 67, 69, 70, 71, 80, 82, 91
See application file for complete search history.

(56) References Cited

U.S. PATENT DOCUMENTS

| | | | |
|---|---|---|---|
| 6,169,940 B1 * | 1/2001 | Jitsukata et al. | ................ 701/23 |
| 7,349,776 B2 | 3/2008 | Spillane et al. | |
| 2008/0009392 A1 | 1/2008 | Ehret et al. | |

FOREIGN PATENT DOCUMENTS

| | | |
|---|---|---|
| CN | 101559773 A | 10/2009 |
| CN | 102092388 A | 6/2011 |

(Continued)

OTHER PUBLICATIONS

Brooks et al., "Self-Supervised Terrain Classification for Planetary Rovers", Proc. NASA Science Technology Conference (NSTC2007), Jun. 19-21, University of Maryland University College, Jan. 1, 2007, pp. 1-8.

(Continued)

*Primary Examiner* — Thomas Tarcza
*Assistant Examiner* — Edward J Pipala
(74) *Attorney, Agent, or Firm* — Myers Bigel & Sibley (57) ABSTRACT

The present invention provides a vehicle control system (110) and method operable to control at least one vehicle subsystem (120, 130, 140, 150, 160) to operate in a selected one of a plurality of subsystem configuration modes. The control system is operable in a plurality of driving modes in each of which it is arranged to select the subsystem configuration mode of the at least one vehicle subsystem in a manner suitable for a respective type of driving surface. The control system uses the output of an imaging device (115) capturing the driving surface on which the vehicle is driving or will likely be driving.

32 Claims, 7 Drawing Sheets (51) Int. Cl.
  *B60W 10/06* (2006.01)
  *B60W 10/18* (2012.01)
  *B60W 10/20* (2006.01)
  *B60W 10/22* (2006.01)
  *B60W 50/08* (2012.01)
  *B60W 40/06* (2012.01)
  *B60W 40/076* (2012.01)
  *B60W 50/14* (2012.01)

(52) U.S. Cl.
  CPC .......... *B60W40/076* (2013.01); *B60W 50/0097* (2013.01); *B60W 2050/0095* (2013.01); *B60W 2050/146* (2013.01); *B60W 2420/42* (2013.01); *B60W 2550/12* (2013.01); *B60W 2550/402* (2013.01)

(56) References Cited

FOREIGN PATENT DOCUMENTS

| | | |
|---|---|---|
| DE | 42 35 104 A1 | 4/1994 |
| DE | 10 2008 038037 A1 | 2/2010 |
| JP | 05-69011 B | 7/1987 |
| JP | 2002-150302 A | 5/2002 |
| JP | 2002-162343 A | 6/2002 |
| JP | 2004-168154 | 6/2004 |
| JP | 2004-243895 A | 9/2004 |
| JP | 2006-213294 A | 8/2006 |
| JP | 2008-280991 A | 11/2008 |
| JP | 2010-111179 A | 5/2010 |
| JP | 2010-163131 A | 7/2010 |
| JP | 2010-287015 A | 12/2010 |
| JP | 2011-025895 A | 2/2011 |
| WO | WO 2010/019045 A1 | 2/2010 |

OTHER PUBLICATIONS

Halatci et al., "A Study of Visual and Tactile Terrain Classification and Classifier Fusion for Planetary Exploration Rovers", ROBOTICA, Cambridge, GB, vol. 26, Jan. 1, 2008, pp. 767-779.

Office Action Summary, Japanese Patent Application No. 2014-519567, Oct. 6, 2015, 4 pages.

Notification of the First Office Action, Chinese Patent Application No. 201280044708.6, Sep. 17, 2015, 17 pages.

Search Report, Chinese Patent Application No. 201280044708.6, Sep. 1, 2015, 5 pages.

* cited by examiner

VEHICLE CONTROL SYSTEM AND METHOD

RELATED APPLICATIONS

This application is a 35 U.S.C. §371 national stage application of PCT Application No. PCT/EP2012/063730, filed on Jul. 12, 2012, which claims priority from Great Britain Patent Application No. 1111993.0, filed Jul. 13, 2011, the contents of which are incorporated herein by reference in their entireties. The above-referenced PCT International Application was published in the English language as International Publication No. WO 2013/007800 A1 on Jan. 17, 2013.

FIELD OF THE INVENTION

The present invention relates to a control system for one or more vehicle subsystems and to a method of controlling one or more vehicle subsystems. In particular but not exclusively the invention relates to a control system for automatic control of one or more vehicle subsystems. Aspects of the invention relate to a system, to a method and to a vehicle.

BACKGROUND

It is known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions.

It is an aim of embodiments of the present invention to provide an improved driving experience for a driver of a vehicle.

STATEMENT OF THE INVENTION

According to one aspect of the invention for which protection is sought there is provided a vehicle control system operable to control at least one vehicle subsystem to operate in a selected one of a plurality of subsystem configuration modes, the control system being operable in a plurality of driving modes in each of which it is arranged to select the subsystem configuration mode of the at least one vehicle subsystem in a manner suitable for a respective type of driving surface, the control system being operable to receive an output of an imaging device arranged to output an image of the driving surface over which the vehicle may drive and to determine the type of the driving surface responsive to a content of one or more images output by the device, the system being arranged to provide an output corresponding to the appropriate driving mode.

In a further aspect of the invention for which protection is sought there is provided a control system comprising computing means operable to control at least one vehicle subsystem to operate in a selected one of a plurality of subsystem configuration modes, the control system being operable to assume one of a plurality of respective driving modes in each of which it is arranged automatically to select a prescribed subsystem configuration mode of the at least one vehicle subsystem, the computing means being operable to receive an output of an imaging device, the imaging device being arranged to output an image of a driving surface over which the vehicle may drive, the computing means being operable to determine the driving mode of the control system that is appropriate to the driving surface in dependence on a content of one or more images output by the imaging device.

Embodiments of the invention provide means for a vehicle to be controlled according to a determination of terrain into which the vehicle is driving in advance of the vehicle experiencing the terrain. Thus the vehicle control system may be alerted to the type of terrain into which the vehicle is driving and provide an output indicative of the appropriate driving mode.

This has the advantage that a workload on a driver may be reduced since the driver is not required to determine the appropriate driving mode himself.

In an embodiment the system is operable automatically to assume the appropriate driving mode for the type of driving surface determined by the computing means responsive to the content of the one or more images.

The system may be operable to provide an indication to a driver of the appropriate driving mode for the type of driving surface determined by the computing means responsive to the content of the one or more images.

The indication of the appropriate driving mode may be provided by one selected from amongst a visual indication and an audible indication.

The system may be arranged to determine the type of the driving surface responsive to at least one selected from amongst a texture and a composition of the driving surface as determined according to the output of the imaging device.

It is to be understood that by image texture is meant information in respect of the spatial arrangement of color or intensities in an image or selected region of an image.

The system may be arranged to determine the type of the driving surface responsive to a colour of the driving surface as determined according to the output of the imaging device.

This feature has the advantage that if the vehicle is driving on or is about to drive on a driving surface that may be readily recognised responsive to colour of the surface, the vehicle may readily recognise the driving surface.

The system may be further arranged to determine the type of the driving surface responsive to colour features normalised with respect to illumination.

The system may be arranged to determine the type of the driving surface responsive to a composition of the driving surface determined by reference to a texture and a colour of the driving surface, the texture and colour being determined according to the output of the imaging device. By reference to a colour of an image is included reference to colour features of an image normalised with respect to illumination.

Optionally the system is arranged to determine the type of the driving surface responsive to the output of the imaging device in combination with an output of location determining means, the location determining means being operable to provide an output responsive to a geographical location of the vehicle.

The system may be provided in combination with location determining means, wherein the location determining means is operable to provide an output indicative of a type of driving surface on which the vehicle is operating.

The location determining means may be arranged to determine a location of the vehicle by means of a satellite-based global positioning system (GPS), one or more cellular communications network signals, a gyroscopic location determining or tracking system or any other suitable means. The type of surface on which the vehicle is driving may then be determined by reference to a database of the vehicle which may be provided by the vehicle control system, the location determining means or any other suitable means. In some arrangements the database may be accessed remotely by the vehicle, for example by means of a telecommunications link.

This feature has the advantage that the type of driving surface determined by the control means responsive to the output of the imaging device may be checked against a type of driving surface determined by reference to the location determining means thereby to reduce a likelihood that an incorrect determination of driving surface is made.

Optionally the system is arranged to compare the type of driving surface determined by the control means responsive to the output of the imaging device against a type of driving surface determined by reference to the location determining means, in the event of a discrepancy the control means being arranged to determine which of the driving surface types is the correct type.

Further optionally the system is arranged to determine the correct type of driving surface by reference to one or more selected from amongst a probability value in respect of each determination of driving surface type and a look-up table in respect of the particular combination of driving surface types determined.

Thus, the location determining means may be arranged to determine which of the driving surfaces is the correct type responsive to a conflict resolution dataset such as a table providing an indication as to which driving surface is most likely correct for a given combination of indications of driving surface determined by reference to the image content and location determining means respectively.

In an embodiment the system is operable automatically to switch on an illumination source of the vehicle in the event a level of ambient illumination is insufficient for the imaging device to capture a suitable image.

Optionally the system is operable automatically to switch on one or more headlamps of the vehicle.

In an embodiment the system is operable to trigger means for cleaning a window through which the imaging device views the driving surface.

The system may be operable automatically to switch on a wiper of the vehicle thereby to clean the window.

Optionally the imaging device is arranged to detect at least one selected from amongst visible light, infra-red light and ultraviolet light.

In an embodiment the system is operable to determine whether the vehicle is towing an object and to determine the appropriate driving mode responsive to the determination whether the vehicle is towing and the type of driving surface.

This feature has the advantage that if the appropriate driving mode on a given type of driving surface when the vehicle is not towing is different from that when the vehicle is towing, the appropriate driving mode may still be determined.

In an embodiment the system is operable to determine whether the vehicle is towing by reference to the content of one or more images output by the imaging device.

Alternatively or in addition the system may be operable to determine whether the vehicle is towing by reference to whether the object under tow is electrically connected to the vehicle.

Other means for determining whether the vehicle is towing an object are also useful.

Advantageously the driving modes include an off-road mode in which the subsystem configurations are controlled in a manner suitable for driving on rough terrain and an on-road mode in which the subsystem configurations are controlled in a manner suitable for driving on-road.

The driving modes may include a plurality of off-road modes. The driving modes may include a plurality of off-road modes and at least on on-road mode.

By off-road mode is meant a mode designed to allow the vehicle to enjoy improved performance when driving on unsurfaced roads or tracks, comprising materials such as sand, gravel, mud, snow, rocks and/or other natural terrain, compared with operation in an on-road mode designed for operation on surfaced roads. In an embodiment the driving modes include at least one low friction mode in which the subsystem configurations are controlled in a manner suitable for driving on low friction surfaces and a high friction mode in which the subsystem configurations are controlled in a manner suitable for driving on high friction surfaces.

The low friction mode may be arranged to be suitable for driving on grass, gravel and snow.

Optionally the driving modes are selectable by a driver of the vehicle.

Advantageously the driving modes may be selected by means of a terrain selection input arranged to influence the configuration mode selected on the basis of the terrain selected.

Further advantageously the driving modes may be selected by means of a mode of use input arranged to influence the configuration mode selected on the basis of a selected mode of use of the vehicle.

The mode of use input may be arranged to allow selection between a plurality of driving styles.

In an embodiment the driving styles advantageously include a sport style.

Advantageously the system is operable to determine a likely path of a vehicle over the driving surface responsive to one or more input signals and to determine the type of the driving surface over which the vehicle will likely drive responsive to the content of one or more images output by the device.

Thus if the one or more of the images show different types of driving surface the system is able to determine which type of driving surface the vehicle is likely to drive over and to select a driving mode responsive to the type of surface the vehicle is likely to drive over.

The likely path of the vehicle may be determined responsive to one or more of a driver steering control input, accelerator or brake control input, wheel speed signals or any other suitable input. In some arrangements the system may be arranged to track an eye movement of a driver and to determine a likely path of the vehicle responsive to a direction in which a driver is looking as he drives.

It is to be understood that in some arrangements if a path and/or orientation of the vehicle is consistent with an intention to remain on a given driving surface type, such as a surfaced road, the system may remain in a mode appropriate to that driving surface. However if the path and/or orientation is consistent with an intention to depart from the current driving surface onto a new driving surface, the system may assume a mode appropriate to the new driving surface. The system may assume the new mode once the vehicle has started to drive on the new surface, In an embodiment the system is operable to determine a likely path of respective left and right wheels of the vehicle and to determine the type of the driving surface over which the respective wheels will drive responsive to the content of one or more images output by the device.

In an embodiment the system is operable to determine a likely path of each respective wheel of the vehicle and to determine the type of the driving surface over which the respective wheels will drive responsive to the content of one or more images output by the device.

The system may be provided in the form of a vehicle control unit.

Thus the control system may be provided in the form of a substantially unitary module or like object. Alternatively the functionality of the control system may be distributed between or across a plurality of units, modules or the like.

The control system may be arranged to perform an image processing function in which features of an image are normalised with respect to illumination. Optionally, colour features of an image are normalised with respect to illumination.

This allows the system to accommodate variations in lighting levels in an image, and reduces the risk that the system fails to correctly identify the type of driving surface depicted in one or more captured images due for example to the presence of shadows in an image.

Embodiments of the present invention are able to process one or more images in such a manner as to enable the type of surface to be identified even in the presence of shadows or other variations in illumination intensity in the images.

It is to be understood that by image feature is meant data in respect of pixels comprising a portion of an image. By image colour feature is meant data in respect of a portion of an image that is related to colour content of that portion of the image. A process of feature extraction may comprise for example the step of applying one or more local neighbourhood operations to respective portions of an image, or to each pixel of an image. For example, in some embodiments a feature such as a colour feature may be defined in terms of an average of one or more parameters such as intensity of a given colour channel over a prescribed number of pixels or defined area of an image, for example an area 50 pixels by 50 pixels or the like.

The present inventors have found that by processing a captured image such that colour features are normalised with respect to illumination intensity, excellent separation of images into respective image classifications may be made.

For example, red (R), green (G) and blue (B) colour channel intensity may be normalised with respect to illumination intensity by dividing the intensity of each colour channel (R, G, B) by the sum of the intensities of each of the channels, i.e. R+G+B.

It is to be understood that embodiments of the present invention are not reliant on the detection of prescribed road surface markings such as central divider lines, edge markings or the like, in order to determine surface type although some embodiments may take this into account when identifying that the driving surface may be tarmac rather than grass or gravel. Rather, some embodiments of the invention are arranged to determine a composition of a driving surface, for example whether the driving surface is grass, gravel, rock or snow, and to select an appropriate driving mode accordingly.

In some embodiments the control system is operable to detect a sloping driving surface ahead of the vehicle and to change one or more powertrain control maps responsive to detection of a sloping driving surface.

Optionally the control system may change a throttle control map and/or a transmission control map. The control system may be arranged to change one or more powertrain control maps according to whether a driving surface ahead of the vehicle is upward sloping or downward sloping.

The throttle control map may for example provide data allowing an engine controller to determine how much fuel and/or air to deliver to an engine responsive to a given input from a throttle control such as a driver operated throttle control or a cruise control throttle input. The transmission control map may provide data allowing a transmission to determine when to up-shift or down-shift responsive to the value of one or more parameters such as a speed of a portion of a powertrain, an amount of driver demanded torque or one or more other parameters in addition or instead.

The control system may in addition or instead be operable to change a mode of operation of the transmission, for example selecting a low gear ratio mode, a high gear ratio mode or any other suitable mode, responsive to detection of a sloping driving surface. In some embodiments the control system may cause a limit to be placed on the highest (and/or lowest) gear the transmission may assume.

In some embodiments, the control system may be arranged to receive stereoscopic images of the driving surface over which the vehicle may drive. The control system may be arranged to determine the type of the driving surface responsive to an analysis of stereoscopic pairs of images in addition or instead of one or more images obtained along a single line of sight. It is to be understood that stereoscopic images allow depth information to be obtained and may allow a driving surface comprising rocks to be recognised and distinguished from a different driving surface.

In some embodiments the control system may be operable to control a ride height of a vehicle responsive to recognition of one or more features of a driving surface ahead of the vehicle. For example the control system may set a prescribed ride height responsive to recognition that a surface ahead of the vehicle is sloped.

The control system may be operable to set a prescribed ride height responsive to a determination of the type of driving surface ahead of the vehicle.

The control system may be operable to set a prescribed ride height responsive to a determination of a shape of the driving surface ahead of the vehicle.

In an embodiment functionality of the vehicle control system is implemented in software that is run on one or more computing devices of the vehicle. The computing devices may be configured to perform one or more vehicle functions in addition to the functionality of the vehicle control system claimed.

The system may be provided in combination with the at least one vehicle subsystem.

The vehicle control system may be included in a motor vehicle.

According to another aspect of the invention for which protection is sought there is provided a method of controlling a plurality of vehicle subsystems within a motor vehicle in a manner suitable for a respective driving surface comprising the steps of: receiving an output of an image capture device, the capture device being arranged to capture an image of the driving surface over which the vehicle may drive; determining the type of the driving surface responsive to a content of one or more images captured by the device; and providing an output corresponding to an appropriate driving mode of the vehicle for the type of driving surface determined.

According to one aspect of the invention for which protection is sought there is provided a method of controlling at least one vehicle subsystem to operate in a selected one of a plurality of subsystem configuration modes by means of computing means of a control system, the control system being operable to assume one of a plurality of respective driving modes in each of which it is arranged automatically to select a prescribed subsystem configuration mode of the at least one vehicle subsystem, the method comprising receiving by means of computing means an output of an imaging device arranged to output an image of a driving surface over which the vehicle may drive; and determining by means of the computing means the driving mode of the control system that is appropriate to the driving surface in dependence on a content of one or more images output by the imaging device.

According to a further aspect of the invention for which protection is sought there is provided a computer program product comprising a medium on which or in which is stored computer program code which, when executed in a computer system, will perform a method according to the preceding aspect.

According to a still further aspect of the invention for which protection is sought there is provided a vehicle control system operable to control at least one vehicle subsystem to operate in a selected one of a plurality of subsystem configuration modes, the control system being operable in a plurality of driving modes in each of which it is arranged to select the subsystem configuration mode of the at least one vehicle subsystem in a manner suitable for a respective type of driving surface, the control system being operable to receive an output of an image capture device arranged to capture an image of the driving surface over which the vehicle may drive, the control system being operable to determine the type of the driving surface responsive to a content of one or more images captured by the device, the system being arranged to provide an output corresponding to the appropriate driving mode.

Within the scope of this application the various aspects, embodiments, examples, features and alternatives set out in the preceding paragraphs, in the claims and/or in the following description and drawings may be taken independently or in any combination. For example, features described in connection with one embodiment are applicable to all embodiments, unless there is incompatibility of features.

BRIEF DESCRIPTION OF THE DRAWINGS

Embodiments of the invention will now be described, by way of example only, with reference to the accompanying figures in which.

DETAILED DESCRIPTION

Figure 1:
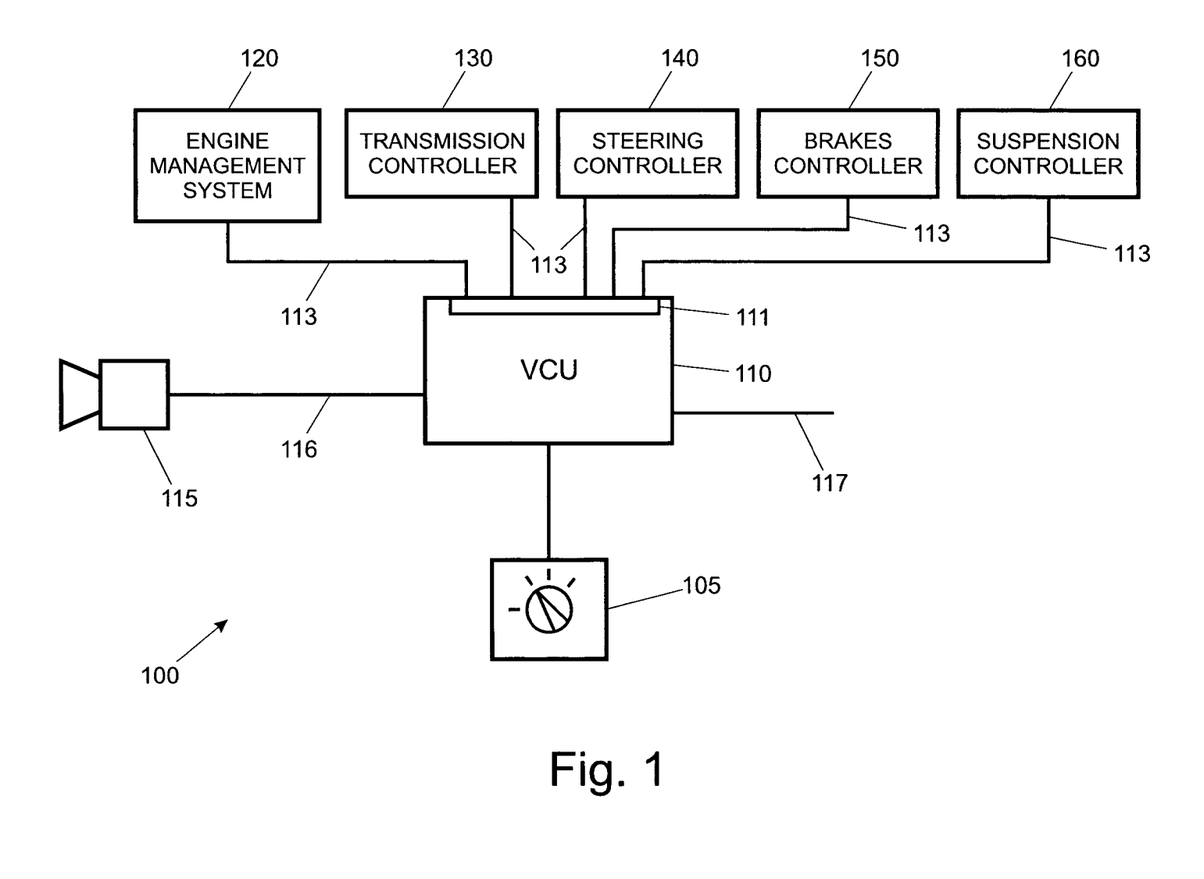
FIG. 1 is a schematic illustration of a vehicle control unit (VCU) and vehicle subsystems under the control of the VCU according to an embodiment of the invention.

FIG. 1 shows a vehicle control system 100 of a motor vehicle. The control system has a vehicle control unit (VCU) 110 arranged to control each of five vehicle subsystems 120, 130, 140, 150, 160. Each of the subsystems 120, 130, 140, 150, 160 is operable in a plurality of respective configuration modes.

The VCU 110 is arranged to control the subsystems 120, 130, 140, 150, 160 to operate in a prescribed configuration mode of each subsystem.

In the embodiment of FIG. 1 the subsystems are an engine management system 120, a transmission system 130, a steering system 140, a brakes system 150 and a suspension system 160. It is to be understood that in alternative embodiments the VCU 110 may be arranged to control a larger or smaller number of subsystems. In some alternative embodiments the VCU 110 may be operable to control one or more different subsystems to those shown in FIG. 1.

The VCU 110 is operable in a plurality of respective driving modes in each of which it is arranged to select a subsystem configuration mode of each subsystem 120, 130, 140, 150, 160 that is suitable for that driving mode. Each driving mode corresponds to a particular type of driving surface on which the vehicle may be driven.

Figure 2:
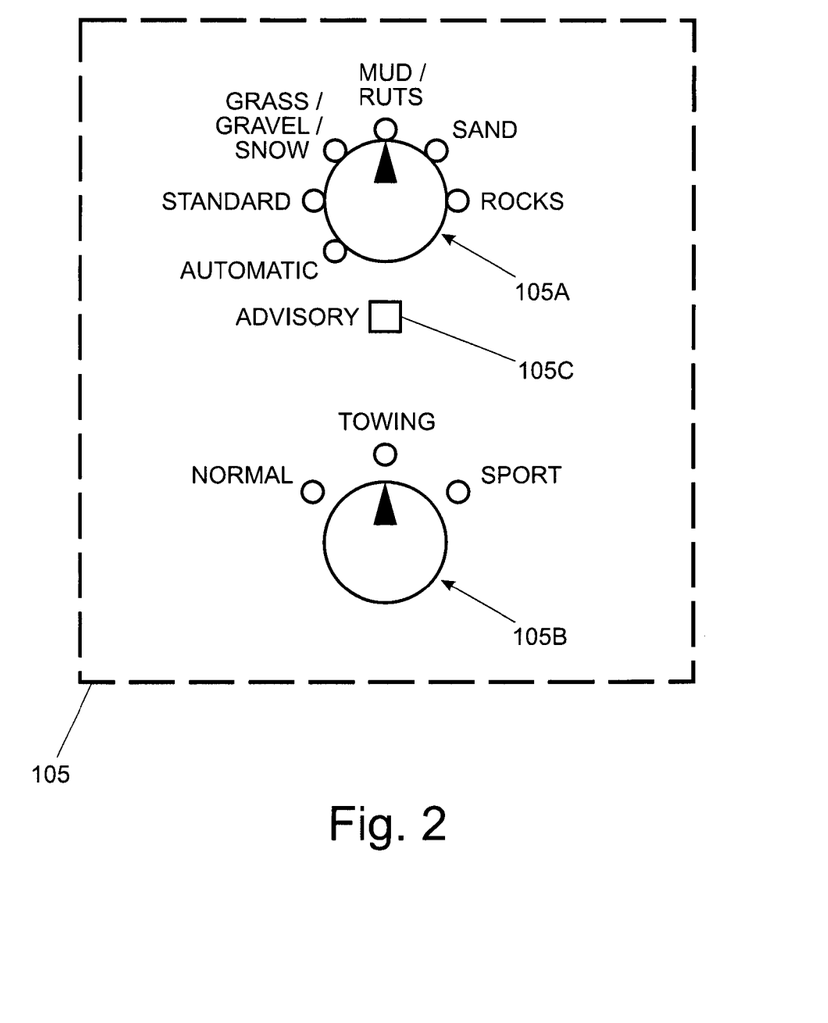
FIG. 2 is a schematic illustration of a driver-operated control console of a vehicle according to an embodiment of the invention.

FIG. 2 shows a portion of a control console 105 of the vehicle by means of which the driver may select a desired driving mode. Driving modes corresponding to the type of driving surface are selected by means of rotary selector dial 105A. The driving modes are: standard mode; grass/gravel/snow (GGS) mode; mud/ruts (MR) mode; sand mode and rocks mode. The selector 105A may also be set to an automatic mode in which the VCU 110 is arranged automatically to select an appropriate driving mode as discussed below.

The console 105 also includes a selector 105B that is arranged to configure the vehicle subsystems 120, 130, 140, 150, 160 to operate in one of three prescribed driving style modes: a normal mode, a towing mode and a sport mode.

It is to be understood that in some embodiments a different number of driving modes corresponding to the type of driving surface and/or driving style may be provided and be selectable by the driver.

The VCU 110 includes a subsystems control module 111 which provides control signals via control lines 113 to each of the vehicle subsystems 120, 130, 140, 150, 160. In some embodiments the VCU 110 is arranged to communicate with the subsystems by means of a network such as a CAN bus or the like.

The subsystems 120, 130, 140, 150, 160 may also communicate with the subsystems control module 111 via the control lines 113 to feed back information on subsystem status to the VCU 110.

Figure 4A:
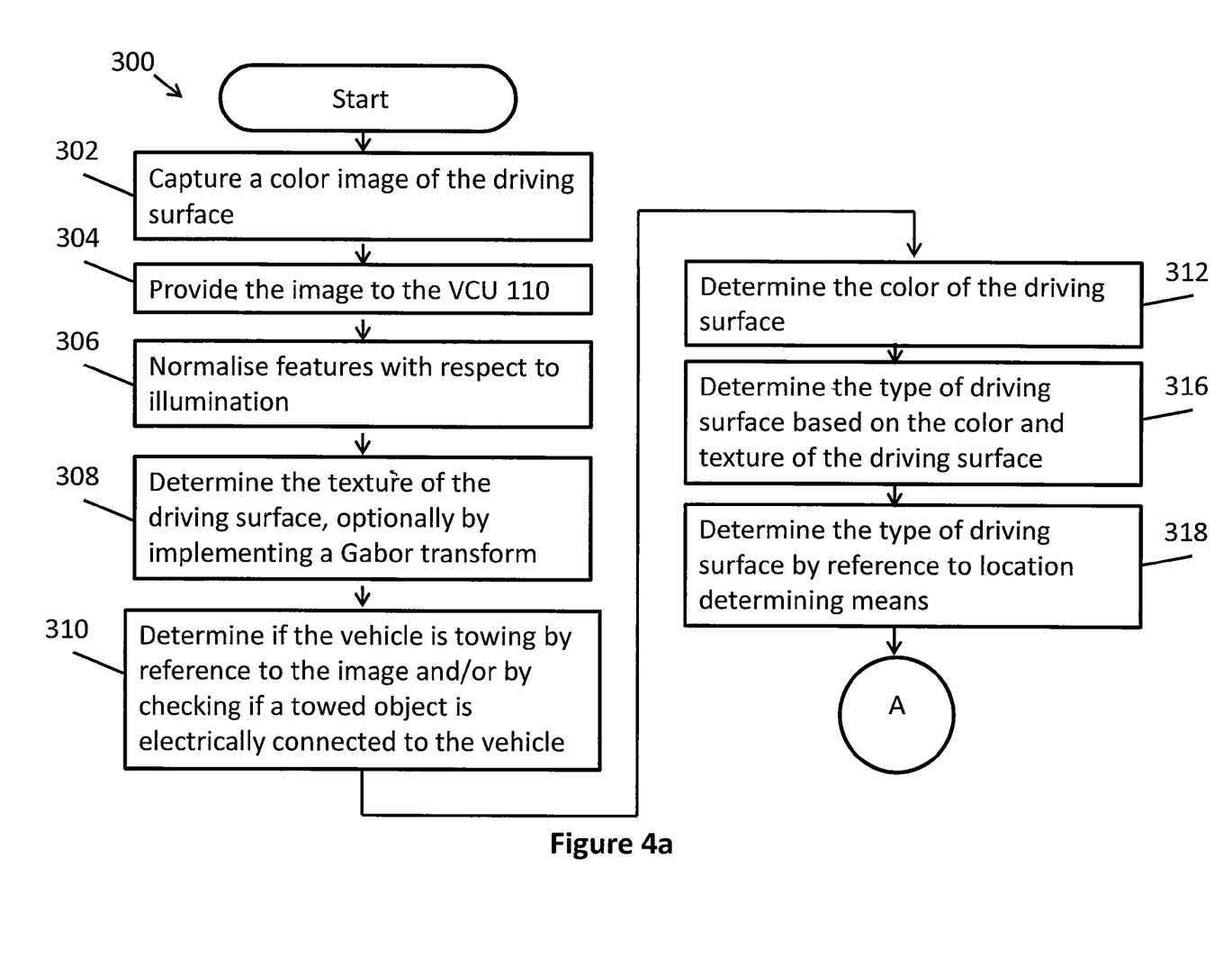
FIGS. 4a and 4b show a flow chart 300 illustrating a control sequence according to an embodiment of the invention.

The VCU 110 is coupled to an image capture device 115 arranged repeatedly to capture an image of a driving surface (or terrain) ahead of the vehicle (FIG. 4a, block 302) and to provide the image to the VCU 110 by means of signal line 116 (FIG. 4a, block 304). It is to be understood that any suitable imaging device may be employed in order to obtain data in respect of a driving surface over which the vehicle may drive. The image capture device 115 may be any suitable device arranged to output an image of a scene viewed by the device 115.

The VCU 110 may also receive one or more signals from one or more other sensors or the like.

The VCU 110 is arranged to process a content of the images captured by the image capture device 115 in order to determine the type of driving surface that is present in the image and on which the vehicle may be driving or be about to drive on.

Once the type of driving surface has been determined, the VCU 110 is operable by means of a switch 105C (placarded 'Advisory' in the embodiment shown) to provide an advisory output to the driver indicating the type of driving surface that the VCU 110 has determined to be most appropriate for the driving surface. If the driver does not wish to receive this advisory output he may deselect the output by means of switch 105C.

Figure 3:
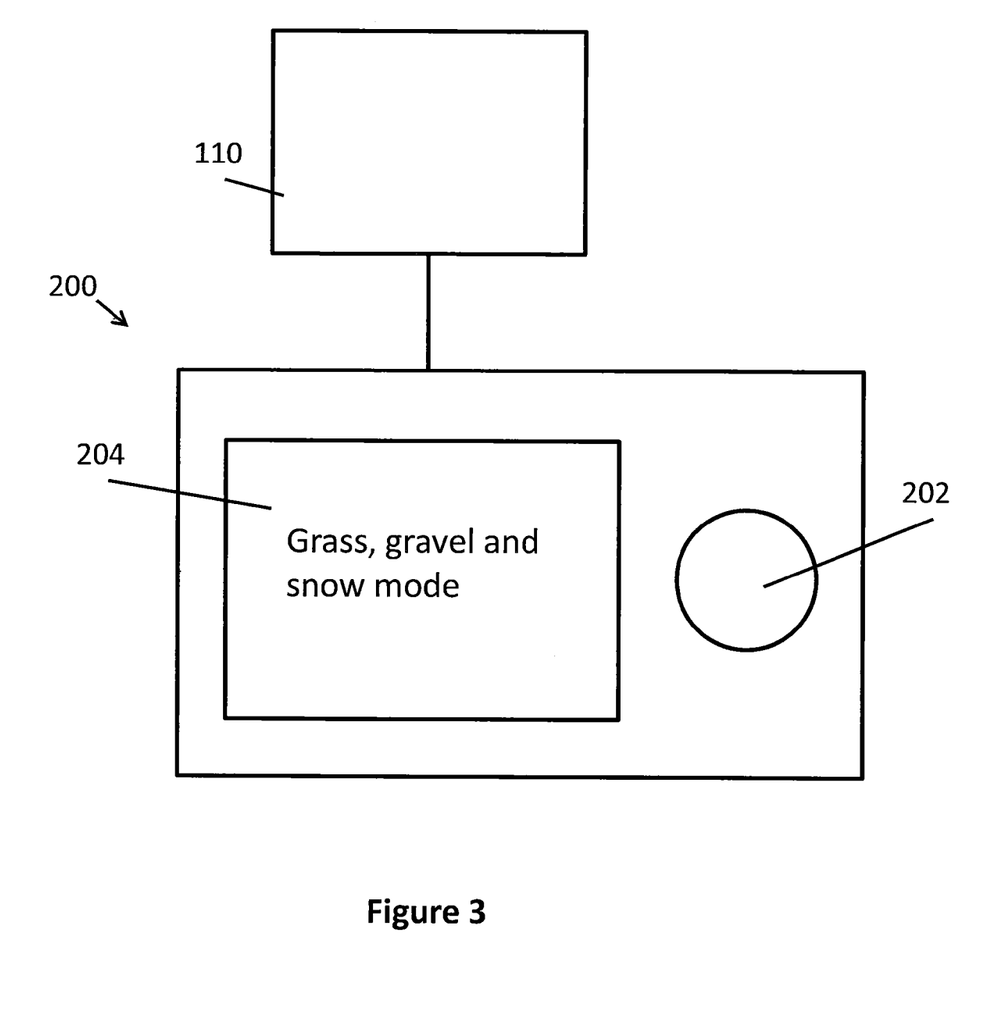
FIG. 3 is a schematic illustration of a user interface 200 operable to provide an indication to a driver of an appropriate driving mode.

In some embodiments the advisory output is provided to the driver in the form a graphic or text displayed on a display panel 204 (FIG. 3). In some alternative embodiments the advisory output is provided in the form of an audible signal, for example from a speaker 202 (FIG. 3), in addition or instead.

In some embodiments the switch 105C is not provided and the VCU 110 is arranged not to provide the driver with an output of the type of driving surface that the VCU 110 has identified. In some alternative embodiments the VCU 110 may provide such an output.

If selector 105A is set to select Automatic mode, the VCU 110 is arranged automatically to select the driving mode appropriate to the type of driving surface that it has identified. Thus the VCU 110 controls the subsystems 120, 130, 140, 150, 160 to operate according to the configuration corresponding to that driving mode.

This feature has the advantage that a workload on a driver may be reduced since the VCU 110 makes the decision in respect of the most appropriate driving mode to select, relieving the driver of this responsibility.

As noted above, the image capture device 115 is arranged to capture an image of the driving surface and to provide the image to the VCU 110. In the present embodiment the image is a colour image although in some embodiments the image may be a black and white image. In embodiments providing a colour image the VCU 110 may be arranged to determine a colour of the driving surface and to take the colour into account in determining the type of the driving surface (FIG. 4a, block 312). In the present embodiment the VCU 110 determines a material composition of the driving surface, i.e. whether the driving surface is composed of tarmac, grass, gravel, snow or rock by analysing texture and colour of an image (FIG. 4a, block 316).

For example, if the driving surface ahead of the vehicle appears to be a colour corresponding to a grassy surface (as opposed to a normal road surface such as an asphalt road surface) such as a green surface the VCU 110 may be arranged to determine that the driving surface may be grass and select the grass/gravel/snow (GGS) driving mode.

Figure 4B:
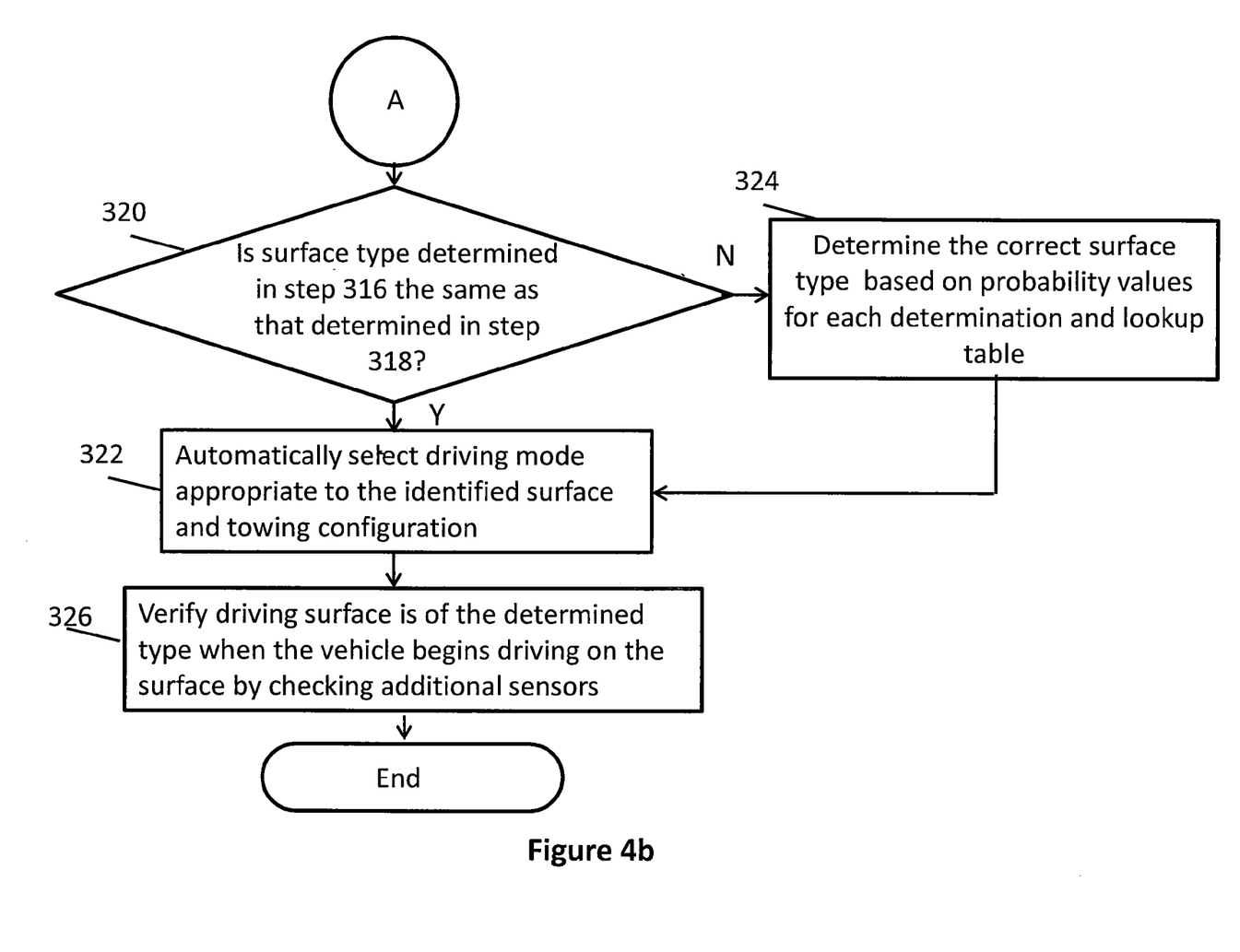

In some embodiments the VCU 110 is operable to cross-check the determination that the surface may be grass by means of a location-determining apparatus such as a satellite-based global positioning system (GPS) apparatus or the like (FIG. 4a, block 318 and FIG. 4b, block 320).

If the VCU 110 subsequently detects a black surface ahead of the vehicle the VCU 110 may be arranged to determine that the surface ahead of the vehicle may be asphalt, rock or the like.

It is to be understood that in the case of a greyscale image of the driving surface (as opposed to a colour image) the VCU 110 may be arranged to take into account a greyscale level of the driving surface rather than a colour of the driving surface.

As noted above, in order to further distinguish between different surfaces the VCU 110 is arranged to determine a texture of the driving surface. It is to be understood that a texture analysis of an image may provide useful information for example in distinguishing between a rough, rocky surface and a relatively smooth asphalt surface.

In some embodiments the VCU 110 is arranged to implement a Gabor transform functionality in order to characterise a texture of the driving surface (FIG. 4a, block 308). Alternatively or in addition the VCU 110 may be arranged to implement a grey level coherence statistical functionality. According to such a functionality the VCU 110 compares a colour, grey scale value and/or brightness of one or more pixels with that of pixels in a vicinity of the one or more pixels. Such a functionality can enable the VCU 110 to distinguish between surfaces that are relatively smooth and featureless with surfaces that are relatively rough. A length scale over which the colour, grey scale value and/or brightness varies may also be useful in identifying a driving surface. For example an asphalt surface may show relatively fine (low length scale) variations in colour or greyscale corresponding to fine stones or gravel embedded in an upper surface thereof. A magnitude of intensity of the variations may also be relatively low.

In contrast, a rocky surface may show variations on a larger length scale corresponding to a size of a rock or portion thereof. The magnitude or intensity of the variations may be larger than those of some asphalt, for example due to the relative size of a rock compared with a gravel stone.

In the present embodiment the VCU 110 is arranged to perform an image processing function in which colour features of an image are normalised with respect to illumination (FIG. 4a, block 306). This allows the VCU 110 to accommodate variations in lighting levels in an image, This reduces the risk that the VCU 110 fails to correctly identify the type of driving surface depicted in one or more captured images due for example to the presence of shadows in an image. Embodiments of the present invention are able to process one or more images in such a manner as to enable the type of surface to be identified even in the presence of shadows or other variations in illumination intensity in the images.

It is to be understood that by image feature is meant data in respect of pixels comprising a portion of an image. By image colour feature is meant data in respect of a portion of an image that is related to colour content of that portion of the image. A process of feature extraction may comprise for example the step of applying one or more local neighbourhood operations to respective portions of an image, or to each pixel of an image. For example, in some embodiments a feature such as a colour feature may be defined in terms of an average of one or more parameters such as intensity of a given colour channel over a prescribed number of pixels or defined area of an image, for example an area 50 pixels by 50 pixels or the like.

It is to be understood that the VCU 110 is not reliant on the detection of prescribed road surface markings such as central divider lines, edge markings or the like, in order to determine surface type. In some alternative embodiments recognisable surface markings may be taken into account when identifying that the driving surface may be tarmac rather than grass or gravel.

In some embodiments the VCU 110 is operable to detect a sloping driving surface ahead of the vehicle and to change one or more powertrain control maps responsive to detection of a sloping driving surface. For example the VCU 110 may change a throttle control map and/or a transmission control map. The VCU 110 may be arranged to change one or more powertrain control maps according to whether a driving surface ahead of the vehicle is upward sloping or downward sloping.

The throttle control map may for example provide data allowing an engine controller to determine how much fuel and/or air to deliver to an engine responsive to a given input from a throttle control such as a driver operated throttle control or a cruise control throttle input. The transmission control map may provide data allowing a transmission to determine when to up-shift or down-shift responsive to the value of one or more parameters such as a speed of a portion of a powertrain, an amount of driver demanded torque or one or more other parameters in addition or instead.

The VCU 110 may in addition or instead be operable to change a mode of operation of the transmission, for example selecting a low gear ratio mode, a high gear ratio mode or any other suitable mode, responsive to detection of a sloping driving surface. In some embodiments the VCU 110 may cause a limit to be placed on the highest (and/or lowest) gear the transmission may assume.

It is to be understood that a variation in colour and/or texture within a given image and between images of similar or different driving surfaces may be relatively complex and therefore machine learning algorithms may be useful in implementing some embodiments of the invention.

The VCU 110 may be arranged to distinguish between different types of surface according to a methodology developed by a machine learning process in which a computing device external to the vehicle 'learns' to distinguish between types of driving surface. The computing device may be provided with a plurality of images of driving surfaces of known type, and an indication of the type of the driving surface as discussed in more detail below. Data generated by the computing device in order to enable it to distinguish between the surfaces may then be provided to the VCU 110 in order to facilitate subsequent driving surface identification in real time whilst the vehicle in which the VCU 110 is installed is being driven.

It is to be understood that a classifier such as a support vector machine and/or neural network arrangement may be useful in implementing some embodiments in which a machine learning process is implemented. The classifier may be implemented offline and not in the vehicle in order to generate a dataset for installing in or importing into the VCU 110. Alternatively or in addition the VCU 110 may be provided with classifier functionality including means for informing the VCU 110 whether or not it has correctly identified a type of a driving surface viewed by the image capture device 115.

It is to be understood that a computing device implementing a classifier may be trained to identify correctly a type of a given driving surface by providing the computing device with data in respect of a plurality of driving surfaces and an identity of each driving surface. The computing device is arranged to 'learn' to distinguish between the driving surfaces. When the computing device is subsequently provided with data in respect of a driving surface it has not been provided with before, the computing device is arranged to correctly identify the type of surface based on the examples it has previously been provided with.

Alternatively, the classifier may be a set of rules determined offline in a heuristic manner. In a further alternative the rules may be determined according to a statistical model using well known detection theory. Other configurations are also useful.

The VCU 110 may be arranged to be provided with an RGB video signal by the image capture device 115. In some embodiments the VCU 110 may be provided with an HSV signal (Hue, Saturation and Value), HSB signal (Hue, Saturation and Brightness) or HSL signal (Hue, Saturation and Lightness). Other signals are also useful.

It is to be understood that the VCU 110 may be arranged to correlate image data received from the image capture device 115 with one or more further signals obtained from one or more sensors of the vehicle responsive to the driving surface over which the vehicle is currently driving. This may be performed in order to obtain secondary verification that the type of driving surface determined responsive to image data obtained from the image capture device 115 is consistent with the one or more further signals (FIG. 4b, block 326). However it is to be understood that at least one advantage of the presence of the image capture device 115 in some embodiments of the present invention is that the vehicle may be arranged to anticipate the type of driving surface over which it is to drive and to select a corresponding driving mode before the vehicle begins driving on the driving surface. Accordingly the VCU 110 may not be able to obtain secondary verification of the type of driving surface that it expects to encounter until it actually begins driving on that surface. Accordingly the VCU 110 may be configured to assume the driving mode corresponding to the type of surface it expects to be driving on imminently. Subsequently, when the vehicle begins driving on that surface the VCU 110 may be arranged to check that the one or more signals (and optionally a correlation between the one or more signals) is/are consistent with the selected driving mode.

The one or more sensors (not shown) of the vehicle may include, but are not limited to, sensors which provide continuous sensor outputs to the VCU 110, including wheel speed sensors, an ambient temperature sensor, an atmospheric pressure sensor, one or more tyre pressure sensors, one or more motion sensors to detect yaw, roll and/or pitch of the vehicle, a vehicle speed sensor, a longitudinal acceleration sensor, an engine torque sensor, a steering angle sensor, a steering wheel speed sensor, a gradient sensor, a lateral acceleration sensor (for example a lateral acceleration sensor of a stability control system (SCS), a brake pedal position sensor and an acceleration pedal position sensor.

In some embodiments one or more of these sensors may not be present. In some embodiments a signal that might be generated by a sensor if the sensor were present may be generated by other means such as by reference to one or more other sensors.

For example engine torque and vehicle gradient may be determined (or estimated) by reference to an output of one or more other sensors rather than by reference to a sensor that measures directly torque produced by the engine or a sensor that measures tilt of the vehicle. Steering wheel speed may be measured by reference to a rate of change of steering wheel angle. Steering wheel angle may be measured by a steering angle sensor.

The VCU 110 may also receive a signal from an electronic power assisted steering unit (ePAS unit) of the vehicle to indicate a steering force applied to the steering wheel of the vehicle by the driver.

The vehicle may also be provided with a plurality of sensors which provide discrete sensor outputs to the VCU 110, including a cruise control status signal (ON/OFF), a transfer box status signal (HIGH RANGE/LOW RANGE), a Hill Descent Control (HDC) status signal (ON/OFF), a trailer connect status signal (ON/OFF), a signal to indicate that a stability control system is active (ON/OFF), a windscreen wiper signal (ON/OFF), an air suspension status signal (HI/LO), and a signal to indicate that a Dynamic Stability Control (DSC) system is active (ON/OFF).

In some embodiments the image capture device 115 is directed to capture an image looking in a forward direction of the vehicle. In some embodiments a further image capture device 115R is provided, the further image capture device 115R being arranged to capture an image looking in a reverse direction of the vehicle. The further image capture device 115R may also be referred to as a reversing image capture device 115R. In some embodiments a plurality of image capture devices may be arranged to capture respective images of terrain over which the vehicle will pass whereby stereoscopic image pairs may be obtained. The VCU 110 may be operable to process data from the plurality of image capture devices in order to determine the type of the driving surface. A plurality of image capture devices may be arranged looking in a forward direction and/or reverse direction with respect to a normal forward direction of travel of the vehicle. In some embodiments an optical arrangement may be provided whereby a single camera is able to obtain stereoscopic image pairs, for example by an arrangement of reflective elements allowing two different respective lines of sight of terrain to be provided to a single image capture device.

In the event the vehicle undertakes a reversing manoeuvre or operation the VCU 110 may be arranged to select a driving mode appropriate to a reversing manoeuvre responsive to the content of one or more images captured by the reversing image capture device 115R.

In some embodiments the VCU 110 may be operable to activate a window wash and/or wipe feature in order to clean a window through which an image capture device 115, 115R is looking. Thus, in the event that an image captured by the image capture device 115, 115R indicates that the window requires cleaning, the VCU 110 may activate the wash and/or wipe feature (FIG. 5, block 302b).

Figure 5:
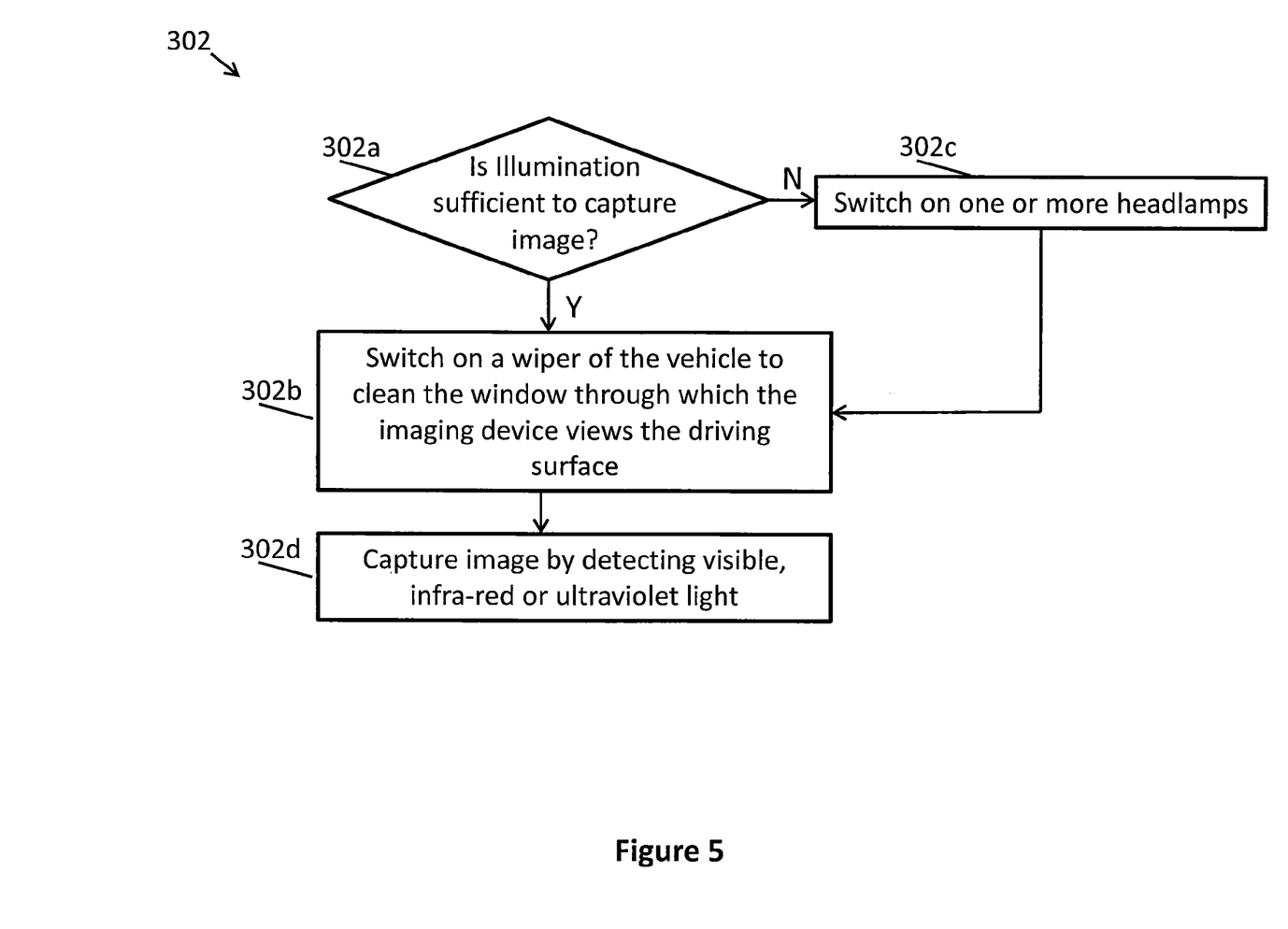
FIG. 5 shows a flow chart illustrating a control sequence for capturing an image in an embodiment of the invention.
Figure 6:
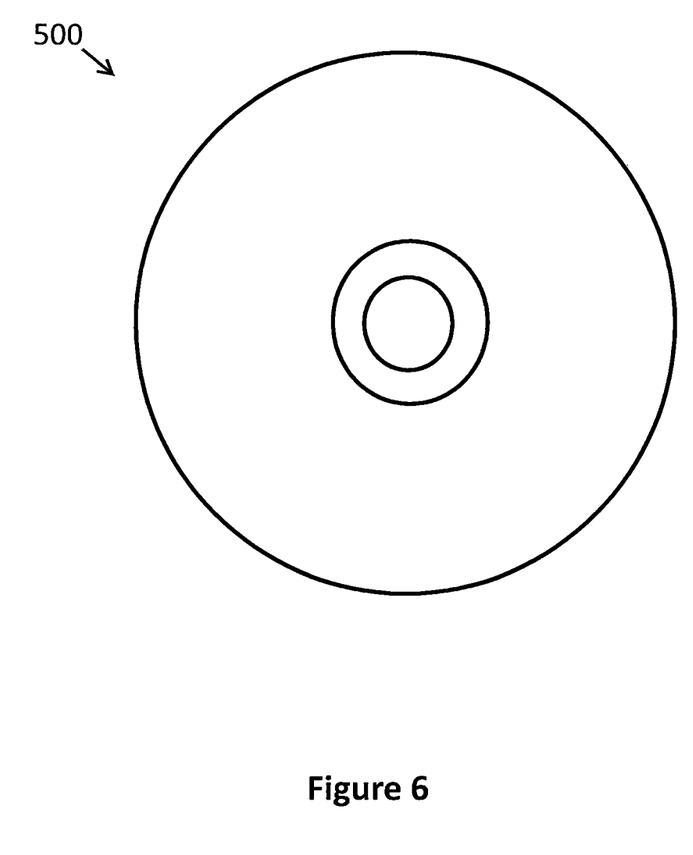
FIG. 6 shows a storage medium 500 on which computer program code is stored for implementing a method in an embodiment of the present invention.

In some embodiments the VCU 110 may be operable to switch on a light source such as a headlight, reversing light or other light source in the event that a light level is insufficient for the image capture device 115, 115R to obtain a suitable image due to a low level of ambient illumination (FIG. 5, blocks 302a, 302c).

In some embodiments the image capture device 115, 115R is arranged to detect visible light. In some embodiments the device 115, 115R may be arranged to detect a different type of light such as infra-red and/or ultraviolet light in addition to or instead of visible light (FIG. 5, block 302d).

Embodiments of the present invention provide a vehicle control unit 110 and a vehicle control system 100 operable to control one or more vehicle subsystems 120, 130, 140, 150, 160 to be configured in a manner most appropriate to a driving surface over which the vehicle may drive or is driving responsive to a content of an image captured by an image capture device. It is to be understood that embodiments of the invention have the advantage that an amount of work required to be performed by a driver may be reduced. Thus a driver who is concentrating on negotiating difficult terrain may concentrate on choosing an appropriate path for the vehicle over the terrain whilst the vehicle anticipates the type of driving surface over which it will drive and configures the vehicle subsystems 120, 130, 140, 150, 160 accordingly.

In some embodiments the VCU 110 is arranged to predict a path of the vehicle responsive to one or more driver input signals such as an input corresponding to an angular position of a steering wheel of the vehicle and/or a signal corresponding to a speed of each road wheel. The VCU 110 may be configured to determine the type of driving surface over which the vehicle is likely to drive and to configure the one or more vehicle subsystems 120, 130, 140, 150, 160 accordingly.

This feature has the advantage that if the vehicle is driving on a dry, smooth, hard road through a sandy desert such that images provided to the VCU 110 include sand, the VCU 110 is less likely to set the one or more vehicle subsystems 120, 130, 140, 150, 160 to a mode corresponding to driving on a sandy surface rather than a mode corresponding to the dry, hard surface over which the vehicle is in fact driving. Thus the VCU 110 may be arranged to recognise that if the vehicle 100 is driving on a road and a path of the vehicle or orientation of the vehicle with respect to the road is consistent with an intention to remain on the road, the VCU 110 may remain in a mode appropriate to driving on the road. However if the path or orientation of the vehicle is consistent with an intention to drive off-road, the VCU 110 may be arranged to select a driving mode consistent with the off-road driving surface in view.

Similarly, if the vehicle is driving on a dry, smooth, hard road through a rocky territory the VCU 110 is less likely to set the one or more vehicle subsystems 120, 130, 140, 150, 160 to a rock crawl or like mode that would be inappropriate for the road surface.

In some arrangements the VCU 110 is arranged to predict the type of surface over which each wheel of the vehicle is likely to drive and to configure the one or more vehicle subsystems 120, 130, 140, 150, 160 for each wheel (or wheels on respective different sides of the vehicle) independently of one another.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. 1111993.0, filed 13 Jul. 2011, the contents of which are expressly incorporated by reference herein.

The invention claimed is:

1. A control system for a vehicle, the control system comprising:
   an imaging device; and
   a vehicle control unit (VCU) coupled to the imaging device, wherein the VCU is configured to:
   receive an image from the imaging device of a driving surface over which the vehicle is driving or may subsequently drive;
   identify a driving surface type in dependence on a composition of the driving surface determined by reference to a texture and a color of the driving surface as determined according to an output of the imaging device;
   select an appropriate one of a plurality of driving modes based on the identified driving surface type; and
   control operation of one or more of the following vehicle subsystems in dependence on the selected driving mode: a suspension subsystem, a steering subsystem, a brake subsystem, an engine management subsystem, and a transmission subsystem.

2. A system as claimed in claim 1, wherein the VCU is configured to automatically select the appropriate driving mode for the driving surface type in dependence on content of one or more images.

3. A system as claimed in claim 2, wherein the image is an image of a driving surface over which the vehicle may subsequently drive, and the VCU is configured to select a driving mode appropriate to the driving surface type before the vehicle begins driving on the driving surface, wherein the VCU is configured to verify the driving surface type when the vehicle subsequently begins driving on the driving surface.

4. A system as claimed in claim 1, wherein the VCU is configured to provide an indication to a driver of the appropriate driving mode for the driving surface type in dependence on content of one or more images.

5. A system as claimed in claim 4 wherein the indication of the appropriate driving mode is provided by one selected from amongst a visual indication and an audible indication.

6. A system as claimed in claim 1, wherein the VCU is configured to verify the driving surface type by checking that one or more signals from one or more additional sensors are consistent with the driving surface type.

7. A system as claimed in claim 1, wherein the VCU is configured to determine the driving surface type in dependence on color features normalised with respect to illumination.

8. A system as claimed in claim 1, wherein the VCU is configured to determine the driving surface type in dependence on the output of the imaging device in combination with an output of location determining apparatus, the location determining apparatus being operable to provide an output in dependence on a geographical location of the vehicle.

9. A system as claimed in claim 8 in combination with location determining apparatus, wherein the location determining apparatus is operable to provide an output indicative of a type of driving surface on which the vehicle is operating.

10. A system as claimed in claim 9, wherein the VCU is configured to compare the driving surface type in dependence on the output of the imaging device with a driving surface type determined by reference to the location determining apparatus, in the event of a discrepancy the VCU is configured to determine which of the driving surface types is the correct type by reference to data indicating a likely correct type of driving surface for a given combination of a type determined in dependence on the output of the imaging device and a type determined by reference to the location determining apparatus.

11. A system as claimed in claim 1, wherein the VCU is configured to automatically switch on an illumination source of the vehicle in the event a level of ambient illumination is insufficient for the imaging device to capture a suitable image.

12. A system as claimed in claim 11, wherein the VCU is configured to automatically switch on one or more headlamps of the vehicle.

13. A system as claimed in claim 1, wherein the VCU is configured to trigger a window wash and/or wipe feature in order to clean a window through which the imaging device views the driving surface.

14. A system as claimed in claim 13, wherein the VCU is configured to automatically switch on a wiper of the vehicle thereby to clean the window.

15. A system as claimed in claim 1 wherein the imaging device is arranged to detect at least one selected from amongst visible light, infra-red light and ultraviolet light.

16. A system as claimed in claim 1, wherein the VCU is configured to determine whether the vehicle is towing an object and to determine the appropriate driving mode in dependence on the determination whether the vehicle is towing and the driving surface type.

17. A system as claimed in claim 16, wherein the VCU is configured to determine whether the vehicle is towing by reference to content of one or more images output by the imaging device.

18. A system as claimed in claim 16, wherein the VCU is configured to determine whether the vehicle is towing by reference to whether the object under tow is electrically connected to the vehicle.

19. A system as claimed in claim 1 wherein the driving modes include an off-road mode in which the subsystem configurations are controlled in a manner suitable for driving on rough terrain and an on-road mode in which the subsystem configurations are controlled in a manner suitable for driving on-road.

20. A system as claimed in claim 1 wherein the driving modes include at least one low friction mode in which the subsystem configurations are controlled in a manner suitable for driving on low friction surfaces and a high friction mode in which the subsystem configurations are controlled in a manner suitable for driving on high friction surfaces.

21. A system as claimed in claim 20 wherein the low friction mode is arranged to be suitable for driving on grass, gravel and snow.

22. A system as claimed in claim 1 wherein the driving modes are selectable by a driver of the vehicle.

23. A system as claimed in claim 22 wherein the driving modes may be selected by means of a terrain selection input arranged to influence the configuration mode selected on the basis of the terrain selected.

24. A system as claimed in claim 22 wherein the driving modes may be selected by means of a mode of use input arranged to influence the configuration mode selected on the basis of a selected mode of use of the vehicle.

25. A system as claimed in claim 24 wherein the mode of use input is arranged to allow selection between a plurality of driving styles.

26. A system as claimed in claim 25 wherein the driving styles includes a sport style.

27. A system as claimed in claim 1, wherein the VCU is configured to determine a likely path of the vehicle over the driving surface in dependence on one or more input signals and to determine the type of the driving surface over which the vehicle will likely drive in dependence on the content of one or more images output by the imaging device.

28. A system as claimed in claim 27, wherein the VCU is configured to determine a likely path of respective left and right wheels of the vehicle and to determine the type of the driving surface over which the respective wheels will drive in dependence on the content of one or more images output by the imaging device.

29. A system as claimed in claim 27, wherein the VCU is configured to determine a likely path of each respective wheel of the vehicle and to determine the type of the driving surface over which the respective wheels will drive in dependence on the content of one or more images output by the imaging device.

30. A vehicle having a system as claimed in claim 1.

31. A method of controlling at least one subsystem of a vehicle, the method comprising:

receiving, at a vehicle control unit (VCU), an output of an imaging device arranged to output an image of a driving surface over which the vehicle is driving or may subsequently drive;

determining, via the VCU, a driving surface type in dependence on a composition of the driving surface determined by reference to a texture and a color of the driving surface as determined according to the output of the imaging device;

selecting, via the VCU, a driving mode appropriate to the driving surface type from a plurality of driving modes; and controlling, via the VCU, operation of one or more of the following vehicle subsystems in dependence on the selected driving mode: a suspension subsystem, a steering subsystem, a brake subsystem, an engine management subsystem, and a transmission subsystem.

32. A computer program product comprising a non-transitory medium on which or in which is stored computer program code which, when executed in a computer system, will perform the method of claim 31.

\* \* \* \* \*